(12) United States Patent  
Seabaugh et al.

(10) Patent No.: US 9,054,348 B2  
(45) Date of Patent: Jun. 9, 2015

(54) PROTECTIVE COATINGS FOR METAL ALLOYS AND METHODS INCORPORATING THE SAME

(75) Inventors: Matthew M. Seabaugh, Columbus, OH (US); Sergio Ibanez, Columbus, OH (US); Scott L. Swartz, Columbus, OH (US)

(73) Assignee: NextTech Materials, Ltd., Lewis Center, OH (US)

( * ) Notice: Subject to any disclaimer, the term of this patent is extended or adjusted under 35 U.S.C. 154(b) by 0 days.

(21) Appl. No.: 13/447,155

(22) Filed: Apr. 13, 2012

(65) Prior Publication Data

US 2012/0264031 A1   Oct. 18, 2012

Related U.S. Application Data

(60) Provisional application No. 61/475,206, filed on Apr. 13, 2011.

(51) Int. Cl.
| | |
|---|---|
| *H01M 2/00* | (2006.01) |
| *H01M 2/20* | (2006.01) |
| *H01M 2/22* | (2006.01) |
| *H01M 2/26* | (2006.01) |
| *H01M 2/30* | (2006.01) |
| *H01M 8/00* | (2006.01) |
| *H01M 8/02* | (2006.01) |
| *H01M 8/10* | (2006.01) |
| *H01M 8/12* | (2006.01) |

(52) U.S. Cl.
CPC .......... *H01M 8/0215* (2013.01); *H01M 8/1213* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 4,950,562 | A | 8/1990 | Yoshida et al. |
| 5,942,349 | A | 8/1999 | Badwal et al. |
| 6,120,924 | A | 9/2000 | Chiba et al. |
| 6,129,862 | A | 10/2000 | Munakata et al. |
| 6,458,170 | B1 | 10/2002 | Visco et al. |
| 6,740,441 | B2 | 5/2004 | Jacobson et al. |
| 6,946,213 | B2 | 9/2005 | Seabaugh et al. |

(Continued)

FOREIGN PATENT DOCUMENTS

| | | | | |
|---|---|---|---|---|
| JP | 2008-305670 | * | 12/2008 | ............ H01M 4/86 |
| JP | 2010282896 | | 12/2010 | |

OTHER PUBLICATIONS

English translation of JP 2008-305670.*

(Continued)

*Primary Examiner* — Yoshitoshi Takeuchi
(74) *Attorney, Agent, or Firm* — Porter, Wright, Morris & Arthur LLP

(57) ABSTRACT

An electrochemical device having one or more solid oxide fuel cells (SOFCs), each of the SOFCs including a cathode, an anode, and an electrolyte layer positioned between the cathode and anode; and at least one additional component comprising a metallic substrate having an electronically conductive, chromium-free perovskite coating deposited directly thereon. The perovskite coating has the formula $ABO_3$, wherein A is a lanthanide element or Y, and B is a mixture of two or more transition elements, with the A site undoped by any alkaline earth element, and the perovskite coating exhibits limited or no ionic transport of oxygen.

18 Claims, 16 Drawing Sheets

(56) References Cited

U.S. PATENT DOCUMENTS

| | | |
|---|---|---|
| 7,190,568 B2 | 3/2007 | Wood et al. |
| 2004/0081893 A1 | 4/2004 | Hansen et al. |
| 2006/0104008 A1* | 5/2006 | Wood et al. ............... 361/321.4 |
| 2007/0184204 A1 | 8/2007 | Balagopal et al. |
| 2009/0186250 A1 | 7/2009 | Narendar et al. |
| 2009/0214923 A1 | 8/2009 | Takahashi et al. |
| 2010/0015473 A1 | 1/2010 | Hendriksen et al. |
| 2010/0119886 A1 | 5/2010 | Nielsen et al. |
| 2010/0129727 A1 | 5/2010 | Day et al. |
| 2010/0239937 A1* | 9/2010 | Janousek et al. ............... 429/458 |

OTHER PUBLICATIONS

Lekshmi et al, Electrical transport properties of $LaNi1—xMxO3$ (M=Co, Mn) Thin Films Fabricated by Pulsed Laser Deposition, 17 J. Phys. Consens. Matter 6445-58 (2005).*

English machine translation of JP2010282896, Dec. 16, 2010.

PCT Search Report for PCT/US2012/033692, Jul. 27, 2012.

Choi et al., Oxidation-Resistant Coating of Low Sinterability Conducting Ceramics by Aerosol Deposition on SOFC Metallic Interconnector, ECS Transactions, 25 (2) 1387-1392 (2009).

Hjalmarsson et al, Electrochemical performance and degradation of $(La0.6Sr0:4)0.99CoO3$—$\sigma$ as porous SOFC-cathode, Solid State Ionics 179 (2008) 1422-1426.

Virkar et al., Electrically Conductive Coatings for Metallic Interconnects: Role of Defect Chemistry, SECA Program Review, Apr. 18-21, 2005.

Huang et al., "Sr- and Ni- Doped $LaCoO3$ and $LaFeO3$ Perovskites," J. Electrochem. Soc. 145 (1998) 3220-3227.

Hrovat et al., "Characterisation of $LaNi1—xCoxO3$ as a possible SOFC cathode material," Solid State Ionics 83 (1996) 99-105.

Chiba et al., "An investigation of $LaNi1—xFexO3$ as a cathode material for solid oxide fuel cells," Solid State Ionics 124 (1999) 281-288.

Kharton et al., "Research on the electrochemistry of oxygen ion conductors in the former Soviet Union. II. Perovskite-related oxides," J. Solid State Electrochem. 3 (1999) 303-326.

Kharton et al., Mixed electronic and ionic conductivity of $LaCo(M)O3$ (M=Ga, Cr, Fe or Ni); II. Oxygen permeation through Cr- and Ni-substituted $LaCoO3$, Solid State Ionics 110 (1998) 53-60.

Kharton et al., "Oxygen Permeability of $LaFe1—xNixO3$—$\sigma$ Solid Solutions," Materials Res. Bull. 34 (1999) 1311-1317.

Saracco et al., "Methane combustion on Mg-doped $LaMnO3$ perovskite catalysts," Applied Catalysis B: Environmental 20 (1999) 277-288.

Shaw et al., "Mixed cobalt and nickel containing perovskite oxide for intermediate temperature electrochemical applications," Solid State Ionics 135 (2000) 765-769.

Teraoka et al., "Effect of Cation Substitution on the Oxygen Semipermeability of Perovskite-type Oxides," Chem. Letters (1988) 503-506.

Tikhonovich et al.,"Surface modification of La (Sr)$MnO3$ electrodes," Solid State Ionics 106 (1998) 197-206.

Vaughey et al., "Altering the Equilibrium Condition in Sr- Doped Lanthanum Manganite," Electrochem. Soc. Proc. 99-19 (1999) 361-369.

Kao et al., "Preparation and characterisation of lanthanum nickel strontium oxides by combined coprecipitation and molten salt reactions," Cer. Int'l 26 (2000) 237-243.

* cited by examiner

Figure 4. XRD of LNC Powder Used In Examples 1 and 2.

Figure 5. Scanning electron micrographs of the La(Ni$_{0.6}$Co$_{0.4}$)O$_3$ coating sintered in nitrogen LNC Coated Crofer 22 APU expanded metal mesh.

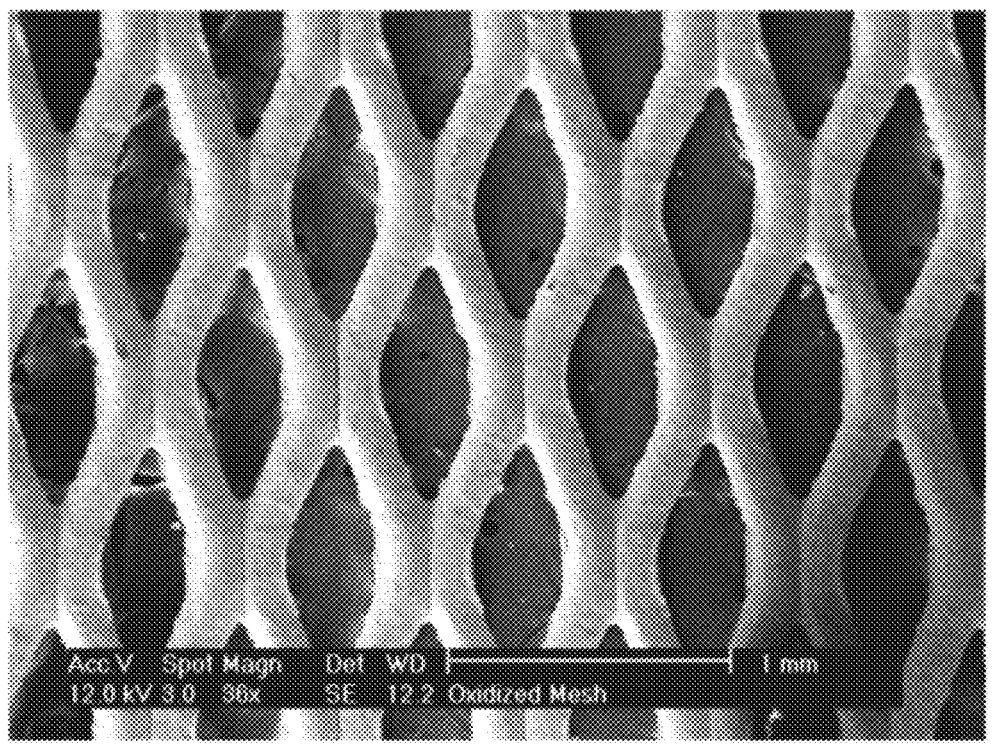
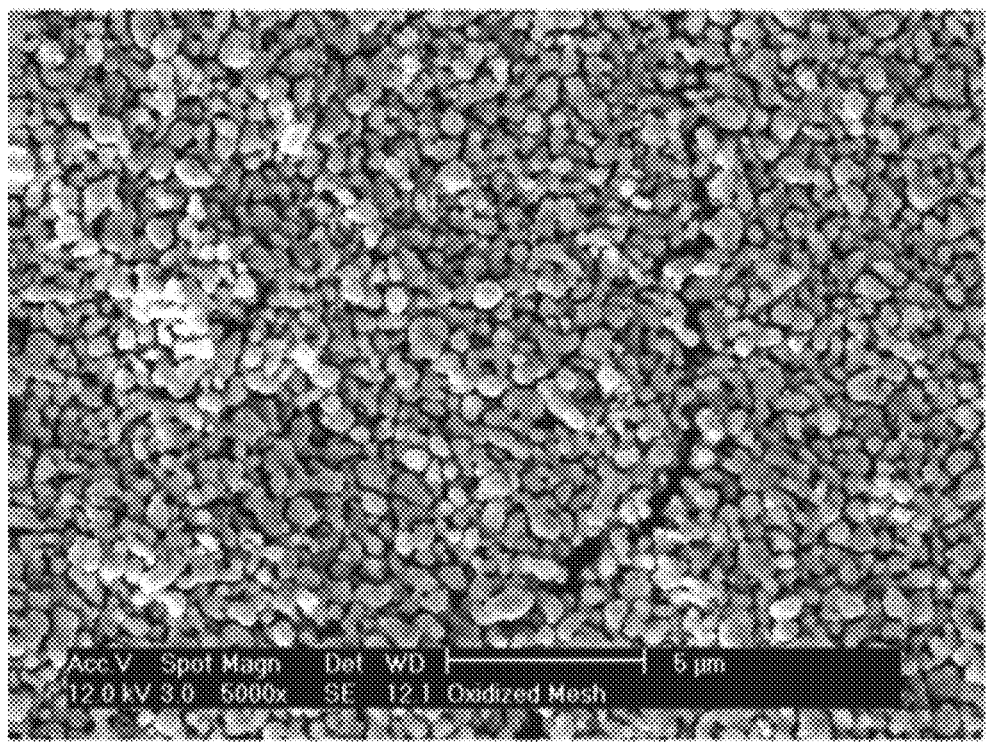
FIG. 12

Conductivity versus Temperature as a function of A-site Occupancy and CuO Content LNC 18 m2/g, Sintered at 1050°C, 2h in Air 5% Deficient LNC 18 m2/g, Sintered at 1000°C, 2h in Air 5% Deficient LNC 18 m2/g + 5% CuO, Sintered at 1000°C, 2h in Air

PROTECTIVE COATINGS FOR METAL ALLOYS AND METHODS INCORPORATING THE SAME

CROSS REFERENCE TO RELATED APPLICATIONS

This application claims priority to U.S. Provisional Patent Application No. 61/475,206, filed on Apr. 13, 2012, entitled "Protective Coatings for Metal Alloys and Methods Incorporating the Same." The disclosure of the foregoing provisional patent application is incorporated by reference herein.

STATEMENT REGARDING FEDERALLY SPONSORED RESEARCH AND DEVELOPMENT

The present invention was partially made with Government support under grant DE-PS02-08ER08-34 awarded by the United States Department of Energy. The Government has certain rights in the invention.

BACKGROUND

In the development of solid oxide fuel cells (SOFCs), there is a need to produce low cost electrically-connecting components such as interconnects typically used between the fuel cells in stacked or bundled cells. In planar stack designs, flat plate interconnect components interleave with the fuel cells, and function as a fuel/air gas separator and electrical connection between cells. In tubular designs, wires, foams, or meshes are used to provide electrical connection between the cells in a bundle.

There is need for a highly conductive electrical component (plate, foam, mesh, etc.) that is robust to long-term service in an oxidizing environment. Purely ceramic materials have been identified as interconnects and current collectors in some stack designs, but such materials are extremely expensive to produce and have poor mechanical stability. Refractory precious metals that resist oxidation can also be used, but are typically cost-prohibitive for commercial products. Powder-metallurgy derived alloys exhibit many of the requisite properties but also suffer from chromium volatilization. The most economically-attractive solutions are often stainless steel alloys which can be produced at low cost in a range of forms.

Several alloys have been proposed, including Ni—Cr containing superalloys, which form conductive chromium-containing spinel coatings. The high nickel content of these alloys makes them cost-prohibitive for commercial applications. Ferritic stainless steel alloys containing Cr at 18% or more are more cost-effective choices. These alloys develop continuous protective scales of chromium oxide or chromium-containing spinel upon oxidation ("native scales"). Inexpensive 430 stainless steel forms $Cr_2O_3$ when oxidized. However, this scale grows and sheds continuously, resulting in a series of spalling events that destroys connectivity between cells.

Crofer 22APU and AL441-HP are ferritic stainless steel alloys having improved corrosion resistance, forming a conductive $(Mn,Cr)_3O_4$ spinel scale during oxidation, which grows slowly and extends service life. However, the $(Mn,Cr)_3O_4$ spinel has low conductivity and does not prevent the subscale growth of $Cr_2O_3$. Furthermore, the volatilization of CrO(OH) over Cr-containing oxides is finite, and it poisons SOFC cathode performance and reduces cell performance. Thus, a path to thin, high conductivity, low Cr-content oxide scales is often desired for planar SOFCs intended for long term operation.

In light of the foregoing, various oxide coatings have been developed to combat corrosion in SOFC stacks and the like. Such coatings can enhance the electrical connection between the metal and the cathode contact paste, and can also slow the growth of low-conductivity chromium oxide and chromium spinel layers. Further, these layers can retard the volatilization of Cr from the alloy surface.

A range of materials have been suggested, including transition metal spinels, which can be inexpensively synthesized and deposited. Spinel coatings are applied by the aerosol spray deposition of slurry consisting of powder of the targeted composition or a mixture of precursor powders that are reaction-sintered to produce an oxide scale of the targeted composition.

Unfortunately, the relatively low bulk conductivity (typically, 60 S/cm or lower) of spinels at SOFC operating temperatures increases stack resistance. To achieve the stoichiometry required to maximize conductivity, spinel coatings are first fired in a reducing atmosphere to form a cermet and then re-oxidized. This increases process complexity and cost. State-of-the-art spinel coatings applied in this manner typically demonstrate area specific resistance values of 5-20 m$\Omega$-cm$^2$.

Alternatively to spinel coatings are perovskite oxide coatings, which, in some instances, offer higher electrical conductivity (100-150 S/cm) with reasonable thermal expansion match to terrific stainless steel. Coatings based on alkaline earth doped perovskites such as $(La,Sr)MnO_3$ and $(La,Sr)CrO_3$, similar in composition to purely ceramic interconnect materials, have been evaluated. However, the refractory nature of these materials has required the use of specialized deposition technologies including sputtering, PVD and pulsed laser deposition. These processes produce dense, uniform coatings, but they require expensive, complex capital equipment for manufacturing. These coatings also require very high processing temperatures and/or exotic applications processes. In addition, they exhibit p-type conductivity rather than n-type, and furthermore exhibit desirable conductivity (>50 S/cm) only at the high end of the SOFC operating range (T=800 C or higher).

Mixed-conducting alkaline earth doped perovskite coatings such as $(La,Sr)FeO_3$ and $(La,Sr)CoO_3$ also have been applied to metals, presenting low initial ASR resistance in testing. However, the resistance of such coated materials increases rapidly, due to native scale growth (oxidation of the underlying alloy from high oxygen flux through the coating) and Cr diffusion into the perovskite coating that forms low-conductivity solid solutions. Furthermore, as Cr diffuses to the surface of the coating, Cr volatilization can occur.

Spinel coatings (oxides typically of the formula $AB_2O_4$, where A is a 2+ valent cation and B is a 3+ valent cation, possessing the crystal structure of the mineral spinel $MgAl_2O_4$), most commonly of the transition metal series of elements (particularly Mn, Ni, Co, Cu, and Fe) have also been evaluated as coating materials for this application. These coatings are typically applied by a redox firing method. However, these coatings have overall lower conductivity values and imperfect thermal expansion match with the underlying stainless steel.

Thus, it is clear that a need exists for a coating for stainless steel and other metallic substrates used, for example, in SOFCs, wherein the coating provides one or more benefits. Such benefits may include, for example, improved corrosion resistance, improved electrical contact and/or reduced chromium volatility. While a variety of oxide coatings have been made and used for such purpose, it is believed that no one prior to the inventors has made or used an invention as described herein.

BRIEF DESCRIPTION OF THE DRAWINGS

FIG. 12 depicts micrographs of the nitrogen-fired coating of Example 4 which has been annealed in air at 1000° C. for 2 hours.

DETAILED DESCRIPTION

Figure 1:
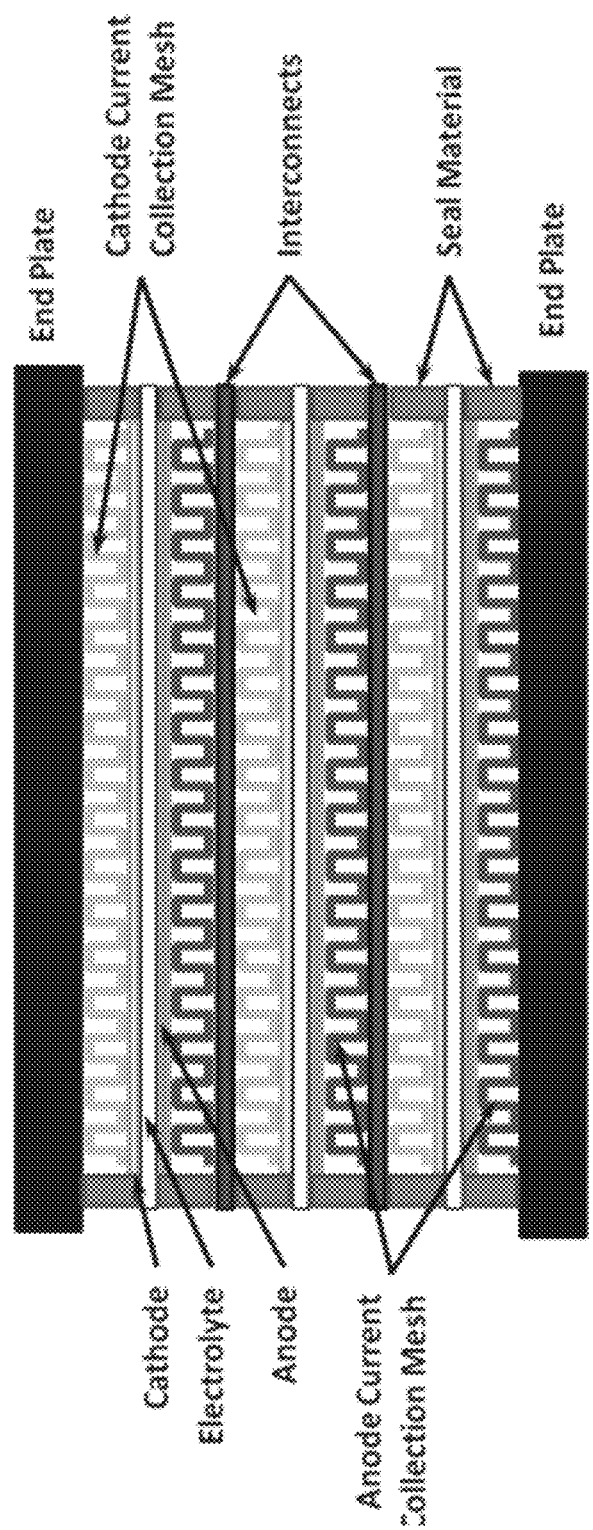
FIG. 1 is a schematic cross-sectional illustration of one embodiment of an electrochemical device employing the perovskite coatings described herein.

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As further described herein, oxide protective coatings for stainless steel and other metallic substrates are provided. These coatings may be used, for example, on electrically-conducting components of SOFCs, such as interconnects, current collectors, end plates, gas delivery pipes, heat exchangers and/or gas separators. The protective coatings are electrically conductive, and exhibit limited or no ionic transport of oxygen. In some embodiments, these protective coatings also may be applied by a a novel coating approach. Leveraging an unique materials design approach, these oxide coatings provide a perovskite coating with unexpectedly low resistance and high stability compared to other coatings, and, if desired, can be processed in easily scaled, low-cost conditions.

The protective oxide coatings described herein may be applied to metallic components used, for example, in solid oxide fuel cells, combustion chambers, high temperature heat exchangers, gasifiers and electrochemical reactors. In one embodiment, the coating is applied to one or more metallic components in solid oxide fuel cell stacks (e.g., an interconnect, current collector and/or gas separator). In one specific embodiment, the metallic component(s) comprise stainless steel of any of a variety of compositions. In addition, the coatings may be deposited by any of a number of coating approaches which provide a protective coating on the solid oxide fuel cell stack component in a cost-effective manner.

Embodiments of the protective perovskite coatings described herein demonstrate a number of beneficial characteristics. For example, in some embodiments, the coating is dense and uniform over the surface of the metal, generally free from regions of poor coverage, pinholes, cracks or other defects so that the coating prevents vapor phase transport of metallic species (such as Cr) from the metal or native scale surface. In some embodiments, the coating density is >90% dense. In particular, a theoretical density of 90% is the calculated value at which porosity in the coating will no longer be interconnected and percolate through the coating thickness. However, coatings having lower theoretical densities may be employed, provided that the coating eliminates any continuous gas path from the metal surface of the coating to the atmosphere (i.e., is substantially non-porous with respect to gas being able to pass through the thickness of the coating). Indeed, in other embodiments the coating density may be >80%, >70, >60% or >50% dense.

In some embodiments, the coating is formed from a perovskite powder having a high surface area in order to increase coating density and eliminate continuous gas paths through the coating (i.e., a non-porous coating). For example, in some embodiments a perovskite powder used to form the coating may have an average surface area greater than about 5 m$^2$/g. In other embodiments, the perovskite powder has an average surface area greater than about 8 m$^2$/g. In still further embodiments, the perovskite powder has an average surface area of about 8 to about 24 m$^2$/g.

In some embodiments, average particle size of the perovskite powder also may be chosen to increase coating density and eliminate continuous gas paths through the coating. For example, the average particle size may be less than about 1 micrometers. In other embodiments, the average particle size may be less than about 0.5 micrometers, or even about 0.2 micrometers or less.

Coating thickness may be chosen in order to minimize its contribution to the component resistance, while thick enough to retard oxygen transport during the anticipated operating life of the component and resist abrasion during handling. In some embodiments, coatings between 1 and 100 micrometers in thickness may be appropriate for the application. In other embodiments, coatings between 1 and 40 micrometers, or between 1 and 10 micrometers in thickness are beneficial. The perovskite coating is, in some embodiments, deposited directly onto to the metallic substrate, with no intervening layers or coatings, as a single uniform layer, of uniform composition. This simplifies the processing requirements and also saves the expense of multiple coatings and the like.

The uniformity of coating thickness is also important in some embodiments in order to minimize stresses during processing and operation. Thus, in some embodiments, the variation in coating thickness can be <50% of the nominal coating thickness. In other embodiments, the variation in coating thickness can be <40%, <30%, <20% or <10% of the nominal coating thickness. In general, greater variation can lead to a greater risk of thermal and mechanical stresses during operation. These stresses lead to crack formation and defect generation during coating densification or operation. Quality of coverage can also be a significant parameter. Defects (such as cracks or pinholes) in the coating create continuous gas paths between the atmosphere and the metal surface. Such defects allow volatile metal species (Mo, Cr, and V, among others) to volatilize, poisoning the contact paste and the SOFC cathode layers. Even relatively small fractions of uncoated metal can create noticeable changes in interconnect performance, and service life.

In some embodiments, the coating should be in intimate contact with the metal surface, with no intervening materials or other layers, in order to provide low contact resistance (e.g., <100 m$\Omega$-cm$^2$, <50 m$\Omega$-cm$^2$, or in some embodiments <30 m$\Omega$-cm$^2$). Delamination or debonding of the coating from the metal during processing or subsequent operation will result in increased area specific resistance, localized heating and degradation.

Along with the aforementioned coating characteristics, the perovskite coatings described herein allow easy transport of conducting species such as electrons and holes, but not oxygen ions. Electron and electron-hole transport (electronic conducting species) is extremely easy in these coatings, making them low resistance coatings. However, while increased electron and electron-hole transport typically also enhances oxygen ion conductivity through the layer to the metal/coating interface (thereby increasing the growth rate of a native scale), the perovskite coatings described herein exhibit little or no ionic transport of oxygen ions therethrough. Thus, since the coatings are poor oxygen ion conductors, the coatings serve as oxygen ion barriers and reduce the rate of intrinsic oxide scale growth.

The process for applying the coatings described herein may utilize low-cost starting materials (such as oxides, carbonates, or metals). The film thicknesses described above are also important consideration in some instances, as the coating process may need to apply uniform coatings over commercially relevant (100 cm$^2$ or greater) areas while maintaining coating uniformity of +/−50% of the coat thickness in some embodiments. The materials used in forming the perovskite coatings of some embodiments are also such that deposition rates may be high in order to minimize capital investment and maximize throughput of components. In addition, some of the coatings may be applied to surfaces without the need for vacuum or specialized atmospheric processing, which would otherwise increase the capital cost.

In some embodiments, conventional spray equipment is used to achieve a high deposition rate of uniform coatings, using low cost starting materials. For example, a process for achieving the desired film density and adhesion can leverage widely utilized low-cost belt furnaces, keeping costs low. Atmosphere control may be used in the processing of films, but in some embodiments is not necessary (see Example 2). Together, the materials and process disclosed herein allow an effective coating to be applied at an economically desirable cost.

As the disclosed compositions can be processed by cost-effective aerosol spray deposition and firing processes, the coatings disclosed herein can be significantly more cost-effective than competing processes such as vacuum-based coating processes or plasma spray coating processes, requiring only simple coating methods such as aerosol spray painting, screen printing, dip coating, and the like. However, in some embodiments, any deposition method as known in the art may be used. For example, in some embodiments, potential deposition methods include:

pulsed laser deposition, a process in which a target of precursor material is vaporized by laser ablation and physically redeposits on the interconnect surface, forming a dense, thin coating.

physical vapor deposition, in which an ion beam is used to vaporize a target the chosen coating composition (or its metallic or oxide precursors). The vapor is driven by an electrically imposed field to deposit on the surface of a metallic substrate, forming a dense, thin coating.

chemical vapor deposition in which chemical precursors are introduced into a vacuum chamber and react to form the target composition.

plasma spray deposition, in which powder of the targeted composition is introduced into a plasma to form a semi-molten aerosol which "splats" against the room temperature metal substrate, cooling to form a continuous coating of solid material cold-spray powder deposition, in which ceramic, cermet or metal powders are introduced to gas streams that are heated (~200-400° C.) accelerated to supersonic velocity, and sprayed on the surface of a metallic substrate, typically in a low ambient gas pressure (or vacuum).

sol-gel methods, in which organometallic precursors are deposited as a polymeric precursor coating (by dip coating, spin coating, or spray coating) at room temperature and subsequently decomposed at high temperature to produce a dense, uniform thin film.

reaction sintered coatings, in which the component oxides, carbonates, nitrates, or other chemical precursors are applied to the surface of the metal and reacted at high temperature to produce a coating of the targeted composition.

or other processes that result in a continuous layer of oxide or oxide precursor.

Figure 2:
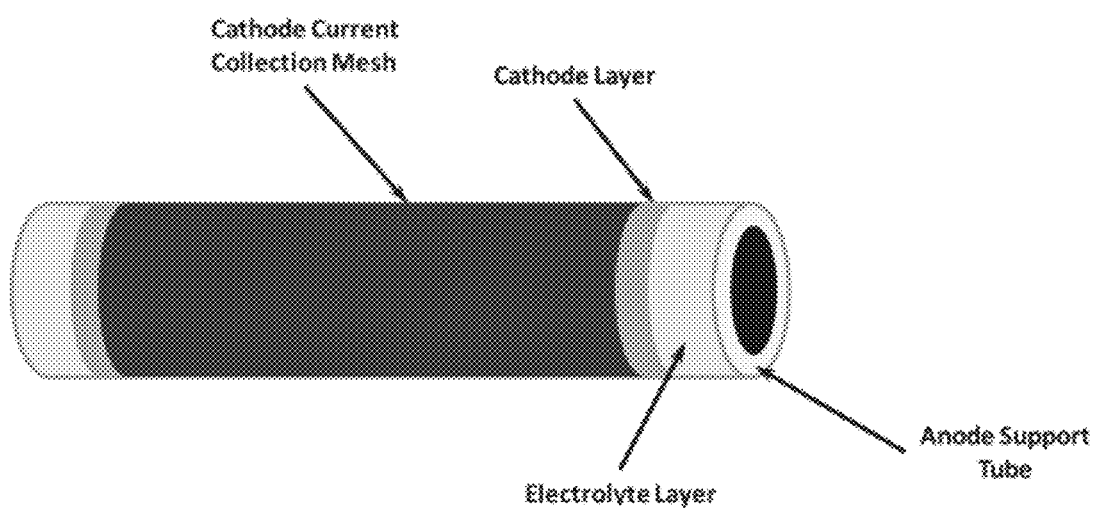
FIG. 2 is a schematic illustration of a tubular SOFC arrangement.

FIG. 1 is a schematic cross-sectional illustration of one embodiment of an electrochemical device employing the perovskite coatings described herein. As further described in U.S. patent application Ser. No. 13/237,902, filed Sep. 20, 2011, and entitled "Fuel Cell Repeat Unit and Fuel Cell Stack", the entirety of which is incorporated herein by reference, the electrochemical device is a solid oxide fuel cell (SOFC) stack which comprises a plurality of repeat units (three in FIG. 1) which are stacked on top of each other. Each repeat unit includes a fuel cell (comprising an anode and cathode, along with an electrolyte membrane therebetween), an interconnect plate located between adjacent repeat units, anode and cathode current collectors in contact with the cathode and anode, respectively, and one or more seals for sealing about the perimeter of the repeat units. The uppermost or bottommost repeat unit may omit the interconnect, and top and bottom end plates are also provided, as shown. Of course any of the other arrangements shown in U.S. patent application Ser. No. 13/237,902 may be employed, as well as the tubular SOFC arrangement shown schematically in FIG. 2.

In the embodiment shown in FIG. 1, one or more of the interconnects, current collectors and/or end plates comprises a metallic substrate (e.g., stainless steel) having an electrically conductive perovskite coating thereon, wherein the perovskite coating exhibits little or no ionic transport of oxygen during use. In the embodiment shown in FIG. 2, the anode supported tubular SOFC includes a cathode current collector (in the form of a metallic mesh) extends about the cathode and is coated with a perovskite coating described herein. In one alternative embodiment of a tubular SOFC, the current collector is in the form of a metallic strip helically wrapped around at least a portion of the cathode layers. Of course one or more metal components of tubular SOFCs and structures employing tubular SOFCs known to those skilled in the art may be coated with the perovskites described herein, such as additional current collectors, interconnects and the like. Similarly, metallic components of other electrochemical devices which include one or more SOFCs also may be coated, particularly metal components which are expected to come into contact with an air stream during operation of the device.

The coated metallic component (e.g., interconnect, current collector and/or gas separator) is, in some embodiments, a solid metal plate, a metal mesh or a metal foam which is coated with the perovskite. In particular embodiments, an expanded metal mesh or metal foam such as stainless steel (e.g., terrific stainless steel) is coated.

In some embodiments, the coating applied to the metallic substrate comprises a perovskite having the formula $ABO_3$, wherein A is a lanthanide element or Y, and B is a mixture of two or more transition elements. Thus, the perovskite composition is an undoped lanthanide or Yttrium-based perovskite, wherein the term undoped lanthanide or Yttrium-based perovskite simply means that the A site is a lanthanide element or Y, with no alkaline earth dopant (such as Sr). In some embodiments, the perovskite exhibits n-type conductivity at typical SOFC operating temperatures (e.g., 600-1000° C.). In some embodiments, the B site comprises >40% Ni and/or >40% Co. In other embodiments, the composition contains 50-70% Ni or Co on the B site.

In still further embodiments, the perovskite composition is chromium-free and comprises $A_xB_yB'_{1-y}O_3$, wherein:
A is a lanthanide element or Y;
B is selected from one or more of Ni and Co;
B' is selected from one or more of Co, Fe, Mn, and Cu;
B and B' are different
$0.9 \leq x \leq 1$; and
$y<1$ In more specific embodiments, y is greater than 0.4, or even greater than 0.5 (such that there is more B than B' in the perovskite). In others, x=1 (with or without y being greater than 0.4).

In one particular embodiment, B is Ni, B' is Co, and y is greater than 0.5 and less than 0.7. In another particular embodiment, L is lanthanum, B is Ni, B' is Co, x is 1, and y is 0.6 (i.e., the perovskite material is $La(Ni_{0.6}Co_{0.4})O_3$).

In yet another particular embodiment, L is lanthanum, B is Ni, B' is Co, x is 0.95, and y is 0.6 (i.e., the perovskite material is $La_{0.95}(Ni_{0.6}Co_{0.4})O_3$).

In still another embodiment, an additional B-site dopant is included such that the perovskite material is $ABO_3$, wherein A is a lanthanide element or Y, and B is a mixture of three or more transition elements (or two or more transition elements and Mg). For example, the perovskite material may comprise $ABB'B''O_3$, wherein the A-site is undoped with an alkaline-earth (i.e., A is a lanthanide or Y) and:
B is Ni or Co;
B' is Co, Fe, Mn or Cu;
B'' is Mg, Sc, Ti, V, Cr, Fe, Zn, Nb, Mo or W; and
B, B' and B'' are not the same.

The above compositions are similar to those described previously, with the addition of one or more of Mg, Sc, Ti, V, Cr, Fe, Zn, Nb, Mo, and W. In some embodiments, the amount of these additional transition elements will be less than the amount of the first two transition B-site components in the perovskite. In particular embodiments where B'' is Cr, the B-site includes less than 10 mol % Cr.ss As discussed previously, the perovskite coatings described herein, when used to coat a metallic component of an SOFC, are electrically conductive and exhibit little or no ionic transport of oxygen at typical SOFC operating temperatures (e.g., 600 to 1000° C., or 800 to 950° C.). By way of example, in some embodiments, the oxygen transference number of the perovskite may be less than about 0.1 within the temperature range of 600-1000° C. Embodiments of the perovskite coating also provide high conductivity, such as at least about 50 S/cm at 700° C., greater than about 100 S/cm at 700° C., or in some embodiments greater than about 500 S/cm at 700° C.

One particular perovskite material for the coatings described herein is a lanthanum nickel cobaltite (LNC), such as $La(Ni_{0.6}Co_{0.4})O_3$. LNCs are perovskite compositions of a family of perovskite materials that are particularly well-suited for the coating of stainless steel (including but not limited to stainless steel AL441HP and Crofer 22APU) for high temperature electrical interconnection. LNC, among other features, is easily reducible. Similar easily reducible perovskite compositions for use as the coatings described herein include other types of Ni or Co-based lanthanide perovskite structures and their derivatives which display some or all of the desired properties described herein. These perovskites require low sintering temperatures and, in some instances, exhibit n-type electronic conductivity.

Figure 3:
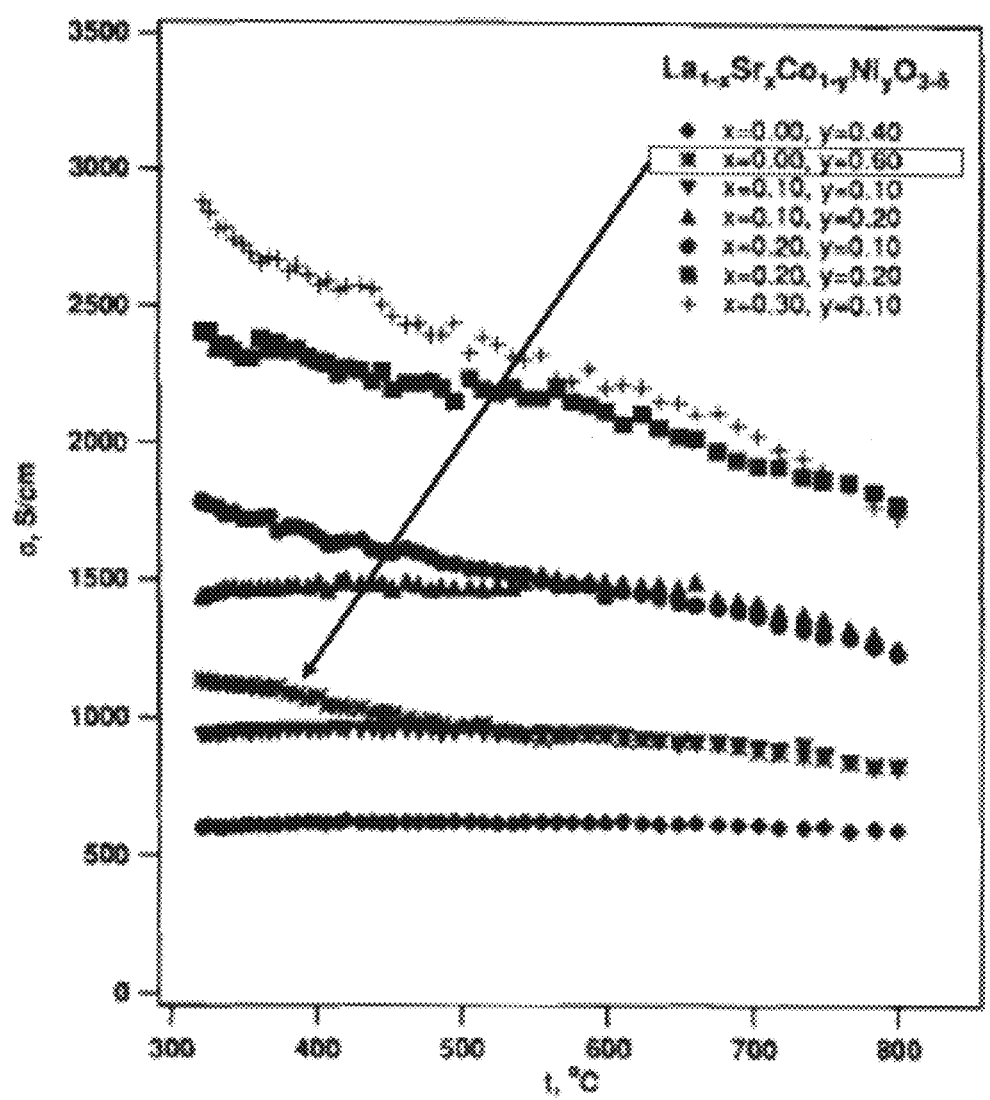
FIG. 3 depicts the temperature dependence of the bulk conductivity of the family $La(Ni,Co)O_3$.

The coating materials are almost purely electronic conductors and the coatings exhibit good performance stability over time. Unlike alkaline earth doped perovskite coatings, such as $(La,Sr)(Co,Fe)O_3$, $(La,Sr)CoO_3$, $(La,Sr)MnO_3$, or $(La,Sr)FeO_3$ which exhibit oxygen conductivity at high temperature, the protective coatings described herein have few oxygen vacancies in the crystal lattice, reducing oxygen diffusion to the metal/oxide interface. The temperature dependence of the bulk conductivity of the family $La(Ni,Co)O_3$, is shown in FIG. 3. Other materials disclosed herein provide similar behavior, broadening the applicability of the approach to a range of perovskite oxides based on transition metal lanthanide formulations.

The perovskite structure of the coatings, and the high content of rare earth elements such as lanthanum and yttrium, also reduces the material cost compared to spinel-based cobalt coatings. Further, the perovskite structure gives the materials higher thermal expansion coefficients which are more appropriately matched to terrific stainless steels than spinel-structured materials. For example, $La(Ni_{0.6}Co_{0.4})O_3$ has a thermal expansion coefficient of 14.3 ppm/° C.; other materials disclosed herein have similar values which closely match ferritic stainless steels.

The perovskites described herein also exhibit negligible loss of oxygen ions at T<1000° C. $La(Ni_{0.6}Co_{0.4})O_3$, for example, is principally an n-type conductor (in which electrons are the dominant charge carrier), with $Ni^{II}$-$Ni^{III}$ ions forming a percolated network of polaron-hopping sites. The material has very high n-type conductivity behavior with temperature ($\sigma$>500 S/cm at 800° C.). In other embodiments, other LNCs, of the previously-described formula $A_xB_yB'_{1-y}O_3$, wherein y is 0.5-0.7, may be employed for similar reasons. At the anticipated operating conditions the contribution of oxygen to the overall conductivity is negligible, oxygen ion activity at the boundary between the steel and the protective layer will remain unaffected by the transport of current.

The LNC family of coatings offers an excellent path to redox firing, with high intrinsic value as a coating in that they can be densified under inert or oxidizing environments. As documented in the redox firing of spinel coatings, Mn is difficult to reduce from mixed oxides to its metallic state. This limits the driving force for reaction sintering in the subsequent oxidation step, and the opportunity to achieve a dense oxide film.

The approach is unique in that it provides a path for applying dense, electronically conductive perovskite layers to the entire metal interconnect surface, using conventional painting methods, and subsequently densifying the coatings through an inert or oxidizing heat treatment. The application of mild reducing, inert and oxidizing atmospheres provides an easily-scaled and incorporated process for applying corrosion-resistant, high conductivity films for solid oxide fuel cell interconnects, gas separators, current collectors and other components.

Developers have suggested the use of using reactive coating and reduction/oxidation processes to produce spinel materials for protective coatings; however, these developments have evolved from mimicking the native scale formation on alloys of interest and the reverse-engineering of the formation of these native scales. The disclosed perovskite coatings depart materially from these prior approaches in that the materials of interest have higher conductivity than spinel materials, and higher thermal expansion coefficients, making them more attractive from a materials compatibility perspective.

Leveraging the low-cost approach of applying the coating material in its fully reacted state, uniformity of composition and microstructure is obtained which is unachievable in competing methods which rely on the deposition of precursor oxides.

The disclosed invention is novel in that the identified materials, unlike other perovskite materials commonly used as SOFC cathodes, may be applied and sintered under mild reducing, and inert atmospheres as well as oxidizing atmospheres, which may reduce production costs.

The approach of applying the material as a coating, designed to block the diffusion of Cr from the metallic interconnect, is distinct from any other use of this family of materials reported in the literature. The approach of applying LNC as a coating that limits oxygen diffusion to the interconnect alloy, thus preventing native scale growth is similarly believed to be unique.

In some embodiments, minor (less than or equal to 10 volume percent) additions of metal oxide may be made to the perovskite material to modify the high temperature sintering of the material, or to improve the properties of the applied coating. Suitable metal oxides include, for example, $SnO_2$, ZnO, NiO, CuO, and other oxides of metals of the transition metal series. Certain embodiments of the approach (Examples 5 and 6) demonstrate that the material adhesion and bulk conductivity can be improved by the addition of copper oxide (CuO) in the amount of 5 volume percent.

Compared to existing spinel and perovskite coating materials and approaches, the embodiments described herein provide lower cost, higher performance coatings. Oxygen diffusivity is limited compared with competing perovskite coatings, while electronic conductivity of the coating will be greatly enhanced compared to existing spinel-based coating approaches.

As the disclosed compositions can be processed by deposition on ferritic stainless steel compositions to provide cost-effective components for SOFC applications, this is not intended to limit the use of these coatings or preclude them from use in alternative applications requiring high temperature conductivity and low interfacial resistance. Further, the demonstrated deposition on ferritic stainless steel does not limit the applicability of these coatings to ferritic stainless steel, but could be applied to a range of substrates consisting of pure metals or alloys for applications requiring high temperature oxidation protection and low electrical contact resistance.

EXAMPLES

Example 1

Nitrogen and Reducing Atmosphere Sintered LNC Coatings

Figure 4:
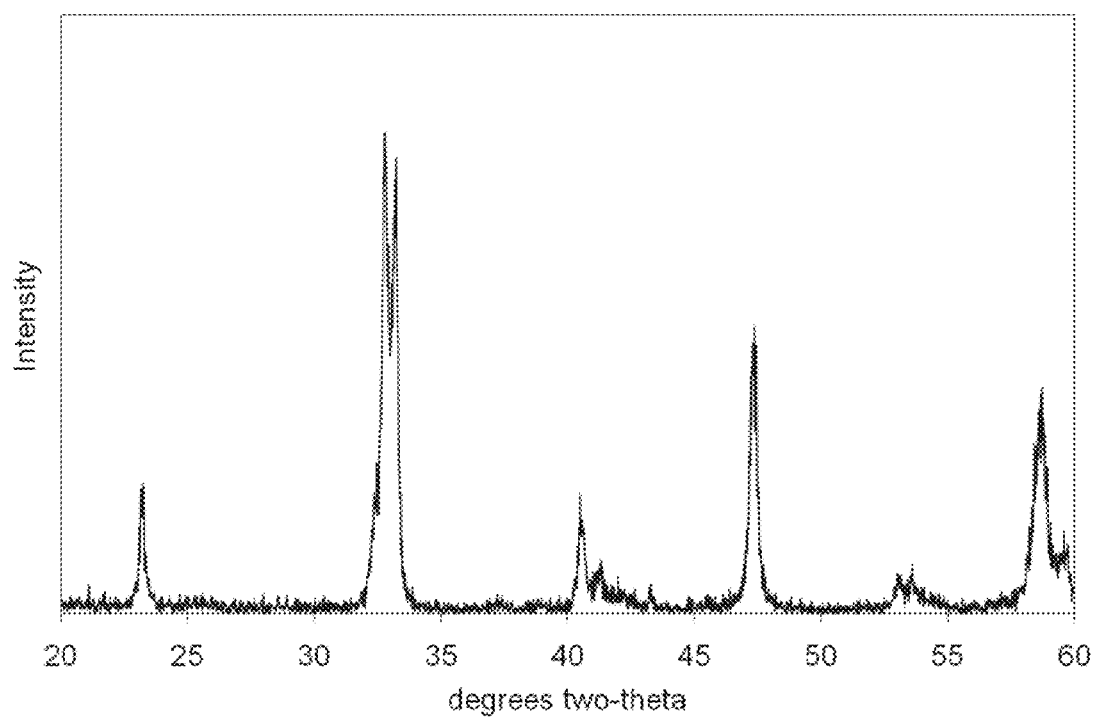
FIG. 4 depicts the XRD pattern of the $La(Ni_{0.6}Co_{0.4})O_3$ powder of Examples 1 and 2.

To demonstrate the concept, LNC powder with a nominal composition of $La(Ni_{0.6}Co_{0.4})O_3$ was prepared by mixed oxide synthesis routes. $La_2O_3$, NiO and $Co_3O_4$ were mixed in appropriate ratios. The powders were attrition milled in a suspension of isopropyl alcohol, dried, sieved and calcined at 1050° C. for 4 hours. The powder was milled in isopropyl alcohol to produce a surface area of 6 $m^2$/g and an average particle size of 0.4 micrometers. The XRD pattern of the resultant material is shown in FIG. 4.

A solvent based spray suspension was prepared with this LNC, a dispersant, and a binder. The layers were sprayed by hand using an aerosol spray airbrush. Films of ~10 micrometers were applied to both sides of 2×2 cm SS441 substrates (100 micrometers thick). The coated parts were annealed in two different ways: annealing at 1000° C. for 4 hours in wet (3% $H_2O$) forming gas followed by oxidation at 1000° C. for 2 hours in air; annealing at 1000° C. for 4 hours in dry nitrogen followed by oxidation at 1000° C. for 2 hours in air.

Figure 5:
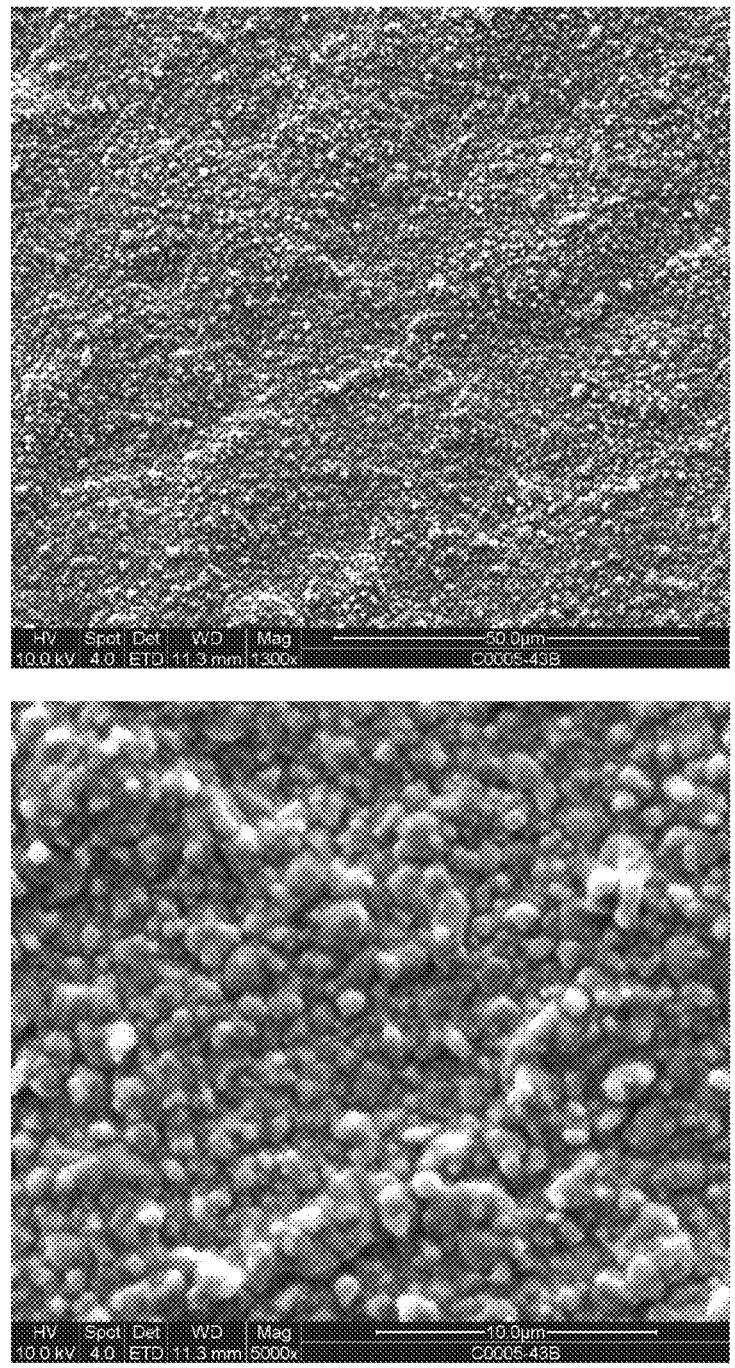
FIG. 5 depicts scanning electron micrographs of the $La(Ni_{0.6}Co_{0.4})O_3$ coating of Example 1 sintered in nitrogen.

Adhesion of the films checked by applying adhesive tape to the surface of the coated part and removing it, thereby applying stress to the coating. This testing confirmed adherence to the metal substrates. The parts presented some discoloration at the edges, with the oxide showing a lighter gray color. As depicted in FIG. 5, this effect was more pronounced for the sample annealed in forming gas. To characterize the LNC coating, applied under nitrogen firing was examined by scanning electron microscopy (see FIG. 5). This examination shows the films are uniform, fine grained and dense.

Figure 6:
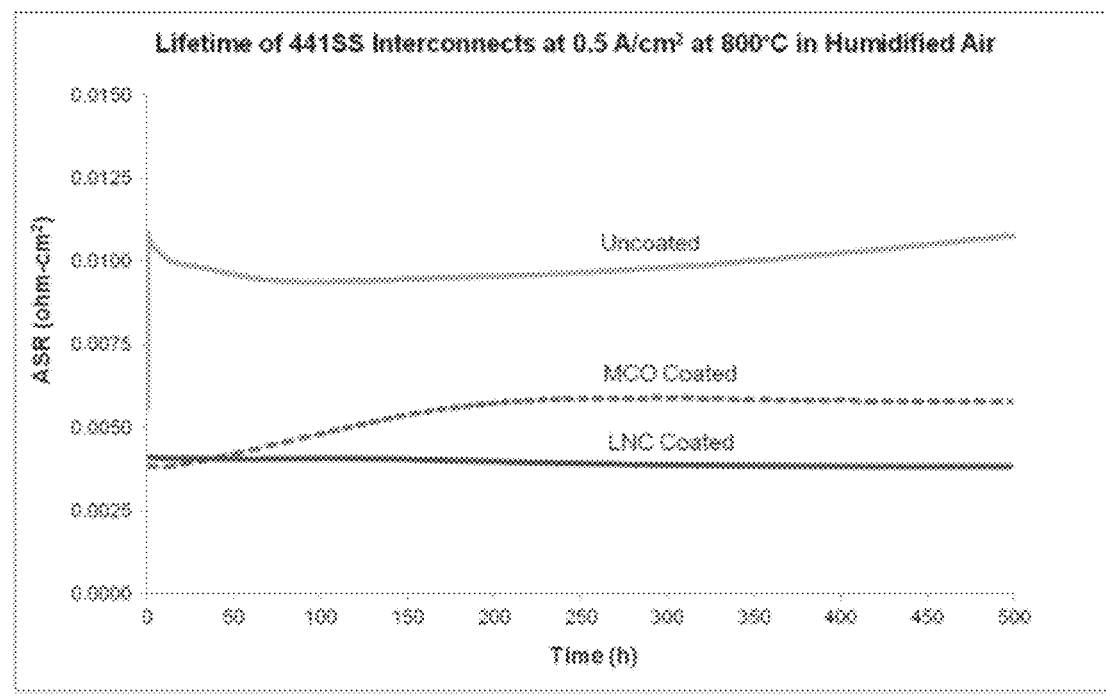
FIG. 6 depicts the time dependent area-specific resistance of uncoated AL441HP, an $LaNi_{0.6}Co_{0.4}O_3$ (LNC) coated AL441HP substrate, and an $Mn_{1.5}Co_{1.5}O_4$ (MCO) coated AL441HP substrate over 500 hours testing, 0.5 A/cm$^2$, 800° C. operation in humidified (3% $H_2O$) air.

The samples were electrochemically tested in a quartz fixture sealed to provide atmosphere control (humidified air). At 800° C., an initial IV curve was collected to determine the area specific resistance (ASR) of the cells. Then, the components were tested at 0.5 A/$cm^2$ for 500 h. The results obtained from a $LaNi_{0.6}Co_{0.4}O_3$ (LNC) coated AL441HP coated substrate, a $Mn_{1.5}Co_{1.5}O_4$ (MCO) coated AL441HP substrate compared to an uncoated AL441HP substrate are shown in FIG. 6. The results of the testing are surprising in that the LNC coating shows little to no change over the first 200 hours of testing.

These results show improved initial performance for the MCO coated part, over the uncoated component. The initial ASR is 3.9 m$\Omega$-$cm^2$ compared to 10.5 m$\Omega$-$cm^2$ for the uncoated part. Long term stability of the MCO coated part is also good. After a burn-out period of 200 hours, the MCO coated part ASR is very stable and it even shows signs of improvement overtime. On the other hand, the uncoated interconnect constantly increases in ASR at an approximate rate of ~3.4 m$\Omega$-cm$^2$/1000 h. The LNC coating, however shows even greater stability in comparison to the MCO-coated sample, presenting only a resistance of 4.0 m$\Omega$-cm$^2$ at the testing onset, and steadily decreasing over the first 500 hours of testing.

Figure 7:
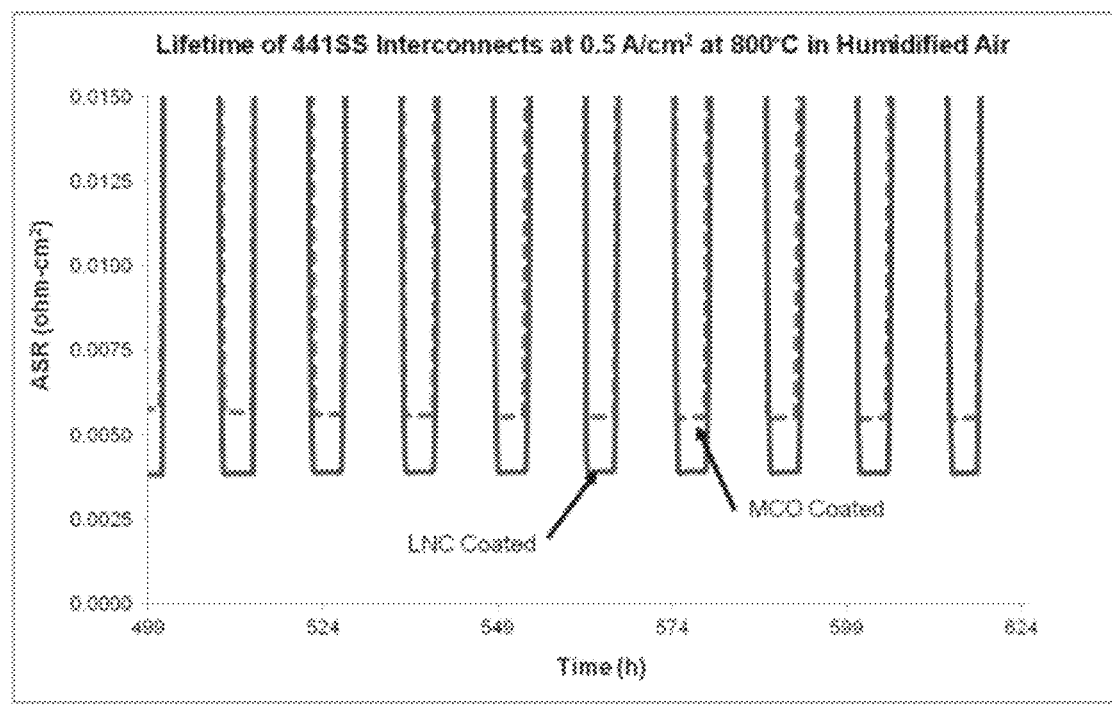
FIG. 7 depicts the time dependent area-specific resistance of an MCO coated AL441HP substrate and an LNC coated AL441HP substrate during thermal cycling, wherein the components were tested at 0.5 A/cm$^2$, oscillating between room temperature and 800° C. in humidified (3% $H_2O$) air.
Figure 8:
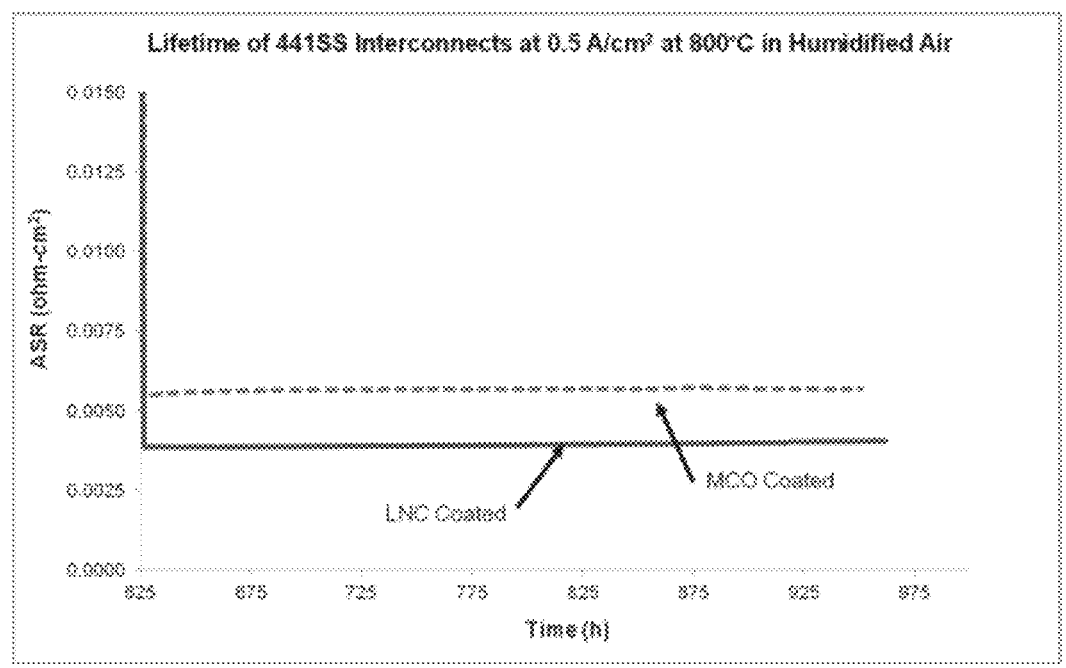
FIG. 8 depicts the time dependent area-specific resistance of the LNC and MCO coated samples of FIG. 7, after the thermal cycle testing, with the samples reset to 800° C. and testing continued.

The stability of the LNC coated sample is also maintained during thermal cycling. The sample was subjected to thermal cycling 10 times from 800° C. to room temperature (5° C./min up and down with 4 hour hold at each condition) at 0.5 amps/cm$^2$ applied current density. As shown in FIG. 7, during the cycle, the LNC and MCO coated samples are unaffected by the temperature cycling, with the LNC coated component maintaining a performance advantage over the life of the test. After the thermal cycle testing, the LNC and MCO coated samples were reset to 800° C. and testing continued (FIG. 8).

Example 2

Air Firing of LNC Coatings

Figure 9:
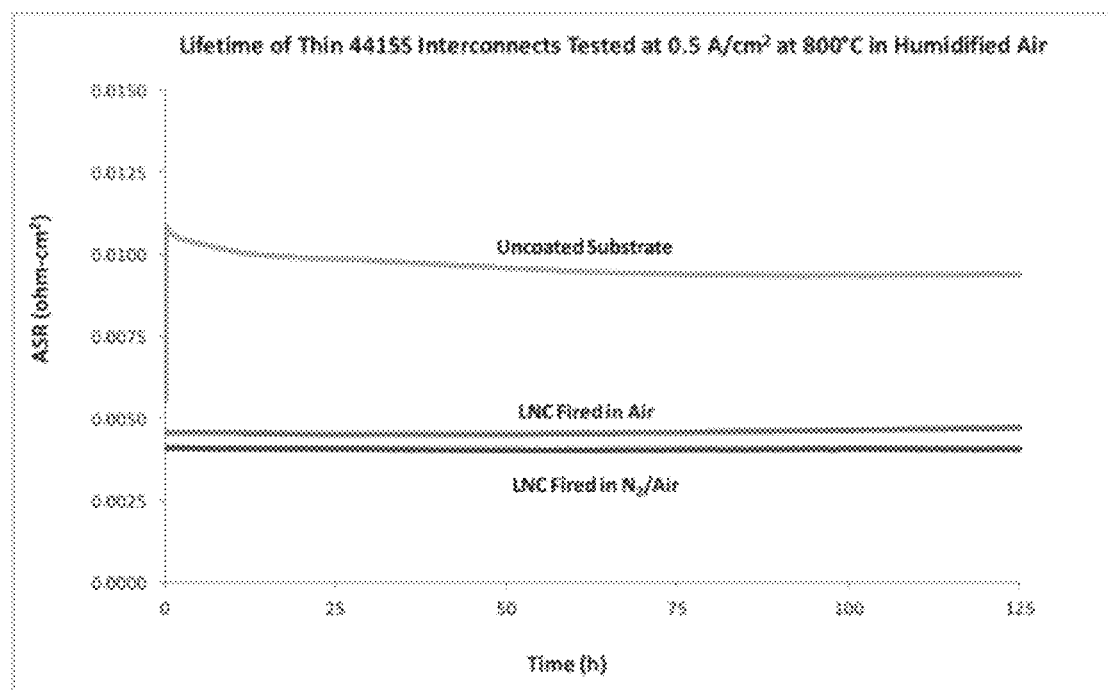
FIG. 9 depicts the time dependent area-specific resistance of an uncoated AL441HP substrate, an LNC coated AL441HP substrate fired in nitrogen and then air atmospheres, and an LNC coated AL441HP substrate fired in air, tested at 0.5 A/cm$^2$, 800° C. in humidified (3% $H_2O$) air.

Using a sample aerosol coated with LNC spray suspension as described in Example 1, the part was sintered in air at 1000° C. for 2 hours. The resultant sample was electrochemically tested in a quartz fixture sealed to provide atmosphere control (humidified air). At 800° C., an initial IV curve was collected to determine the area specific resistance (ASR) of the cells. Then, the components were tested at 0.5 A/cm$^2$. The results obtained from a LNC coated substrate fired in air; a LNC coated substrate fired first in nitrogen and then oxidized in air; and an uncoated substrate are compared in FIG. 9. Like the nitrogen-fired coating, the air fired part shows very stable performance over the first 48 hours of testing, with comparably low area specific resistance.

Example 3

Coating Impact on Cr Diffusion

The LNC coated part tested in Example 2 was sectioned and examined by Energy Dispersive X-ray Spectroscopy (EDS). A chemical composition line-scan was performed through a cross sectioned sample, chemically analyzing a (La,Sr)MnO$_3$ contact electrode, the LNC protective layer, and ultimately the stainless steel component itself. EDS examination demonstrated that the relative concentration of Cr in the cross section was increased at the coating/steel interface, but remained very low in the LNC layer, indicating its diffusion has been blocked.

Example 4

Coating of Metal Mesh with LNC

Figure 10:
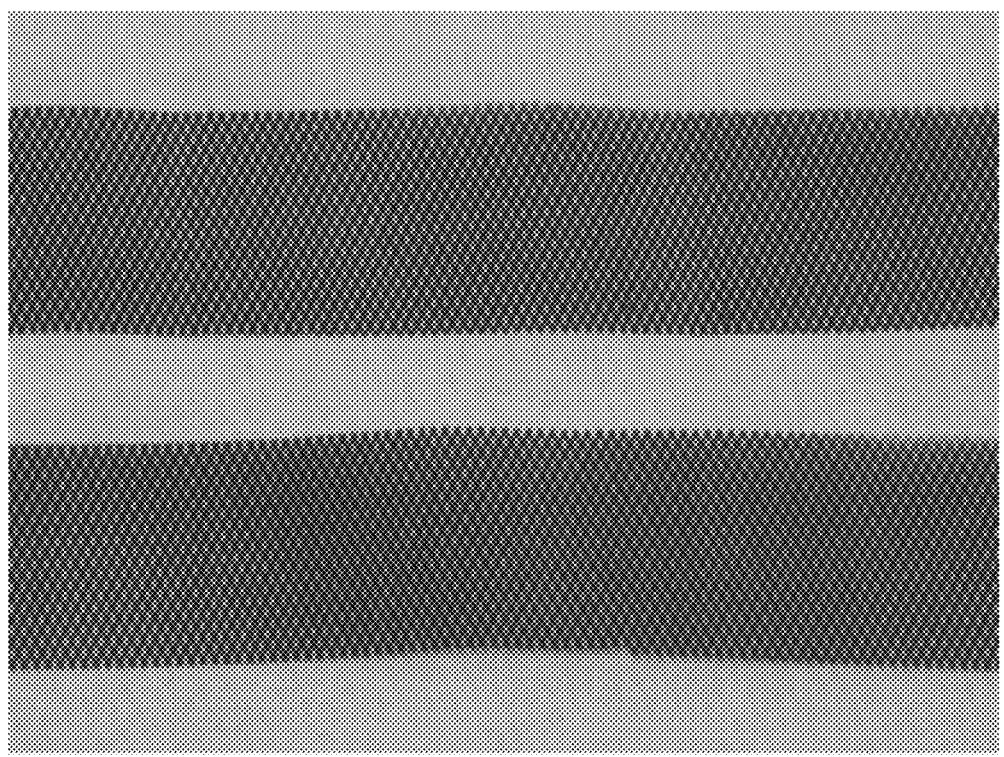
FIG. 10 depicts LNC coated Crofer 22 APU expanded metal mesh.

Using LNC powder and spray suspension prepared as disclosed in Example 1, an expanded metal mesh made from Crofer 22 APU was spray-coated using an airbrush (See FIG. 10). Coating was performed to achieve a visually continuous film on the mesh.

Figure 11:
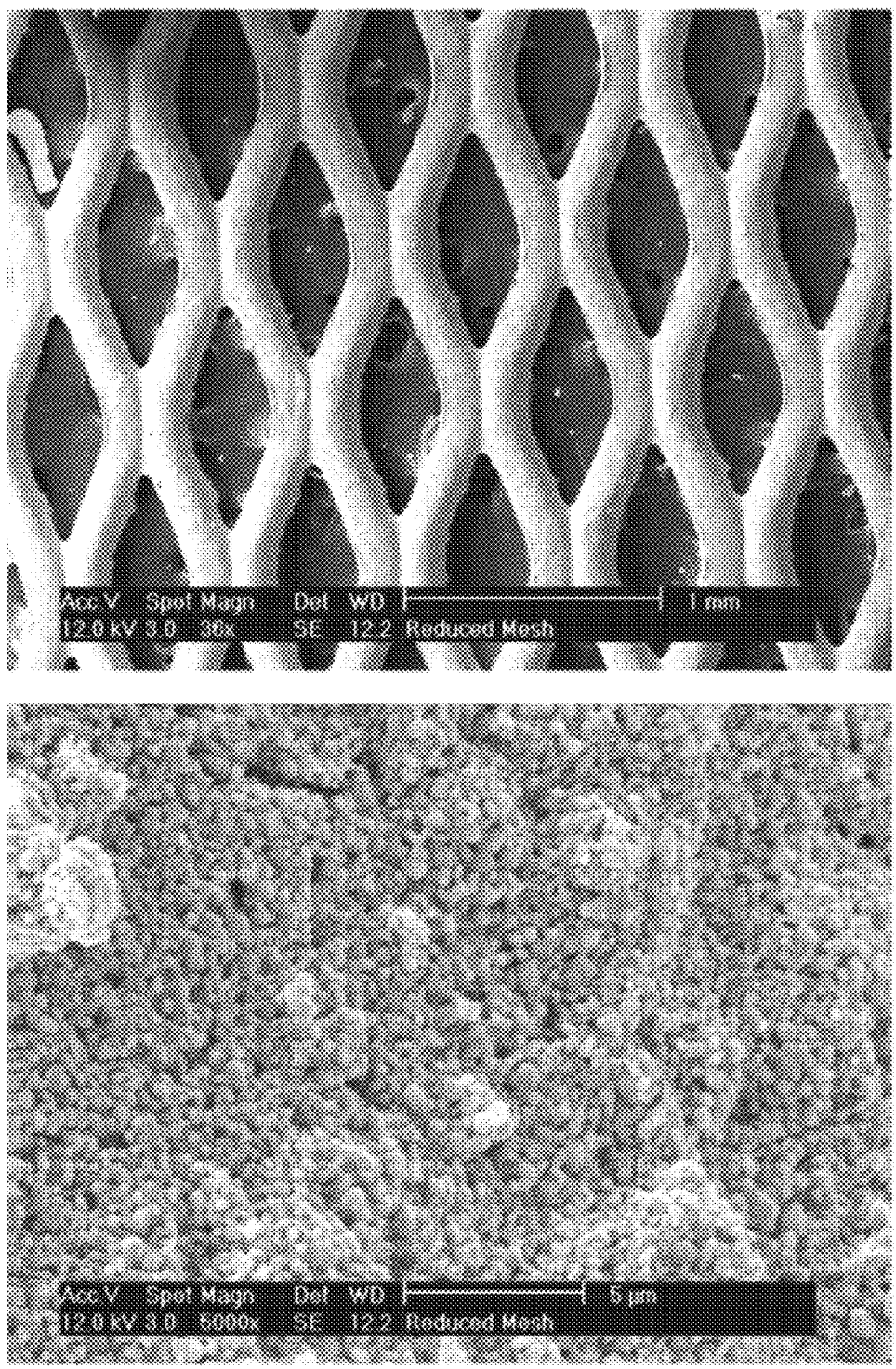
FIG. 11 depicts micrographs of the nitrogen-fired coating of Example 4.

The coated mesh was subsequently fired in a nitrogen atmosphere at 1000° C. for 4 hours. Micrographs of the nitrogen-fired coating are shown in FIG. 11, at low magnification to show overall coverage quality, and at high magnification to show the fine scale microstructure that results. After nitrogen firing, the parts were annealed in air at 1000° C. for 2 hours— micrographs at equivalent magnification are shown in FIG. 12 to document the continuous nature of the coating and the refinement of microstructure after the air annealing. The coatings so produced are appropriate for use as current collectors for tubular and planar SOFCs.

Example 5

Air Firing of La(Ni$_{0.6}$Co$_{0.4}$)O$_3$, La$_{0.95}$(Ni$_{0.6}$Co$_{0.4}$)O$_3$, and La(Ni$_{0.6}$Co$_{0.4}$)O$_3$ with 5 Volume Percent CuO Added, and the Sheet Resistance of Applied Coatings La(Ni$_{0.6}$Co$_{0.4}$)O$_3$d and La$_{0.95}$(Ni$_{0.6}$Co$_{0.4}$)O$_3$ powders with surface area values of 18-24 m$^2$/g were prepared by methods similar to that described in Example 1. A sample of the La(Ni$_{0.6}$Co$_{0.4}$)O$_3$ powder was mixed with 5 volume percent CuO. Inks were prepared from the powders by ultrasonic-mixing the powders with ethyl acetate and terpineol.

Figure 13:
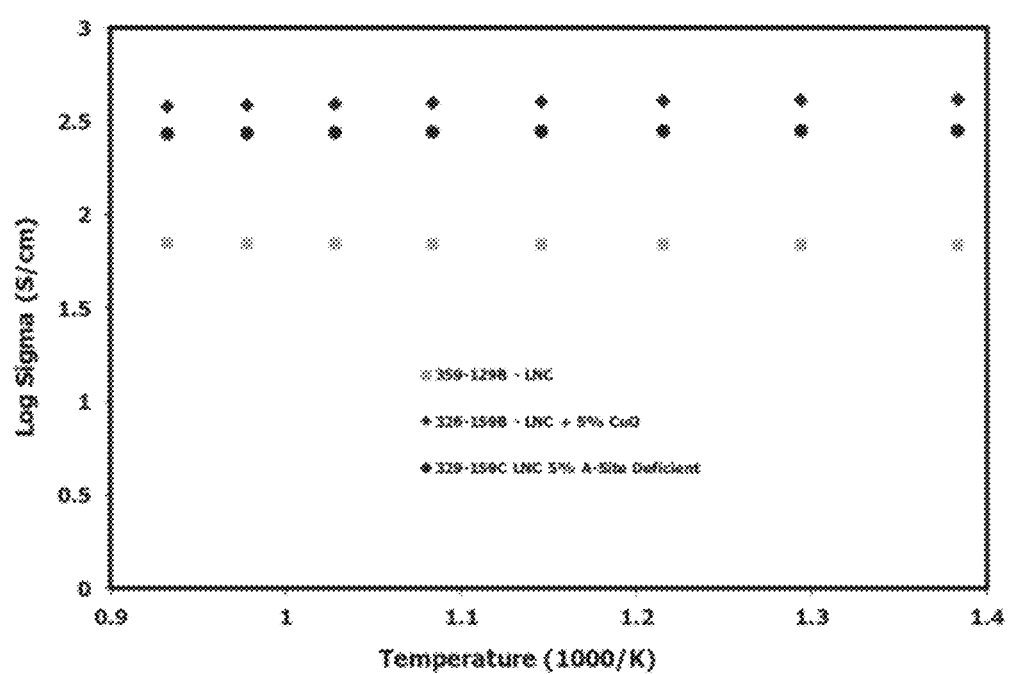
FIG. 13 depicts a plot of conductivity vs. temperature as a function of A-site occupancy and CuO content for the coatings of Example 5.

The materials were tested for lateral conductivity. The inks were screen printed on YSZ substrates (which were previously provided with Pt conductive pads cured at 1000° C.), electroded and tested at 850° C./4 h in air. The conductivity was also determined at lower temperatures (FIG. 13), which shows that the that LNC+5% CuO ink exhibited the highest conductivity, though the La$_{0.95}$(Ni$_{0.6}$Co$_{0.4}$)O$_3$ formulation showed significant advantage over the baseline formulation. It should also be noted that in adhesion tests of the applied coatings, both the CuO addition and formulations with A-site deficiency were better adhered to the zirconia substrate.

Example 6

Air Firing of La(Ni$_{0.6}$Co$_{0.4}$)O$_3$, La$_{0.95}$(Ni$_{0.6}$Co$_{0.4}$)O$_3$, and La$_{0.95}$(Ni$_{0.6}$Co$_{0.4}$)O$_3$ with 5 Volume Percent CuO Added on Stainless Steel La(Ni$_{0.6}$Co$_{0.4}$)O$_3$ and La$_{0.95}$(Ni$_{0.6}$Co$_{0.4}$)O$_3$ powders with surface area values of 18-24 m$^2$/g were prepared by methods similar to that described in Example 1. A sample of the La$_{0.95}$(Ni$_{0.6}$Co$_{0.4}$)O$_3$ powder was mixed with 5 volume percent CuO powder.

Figure 14:
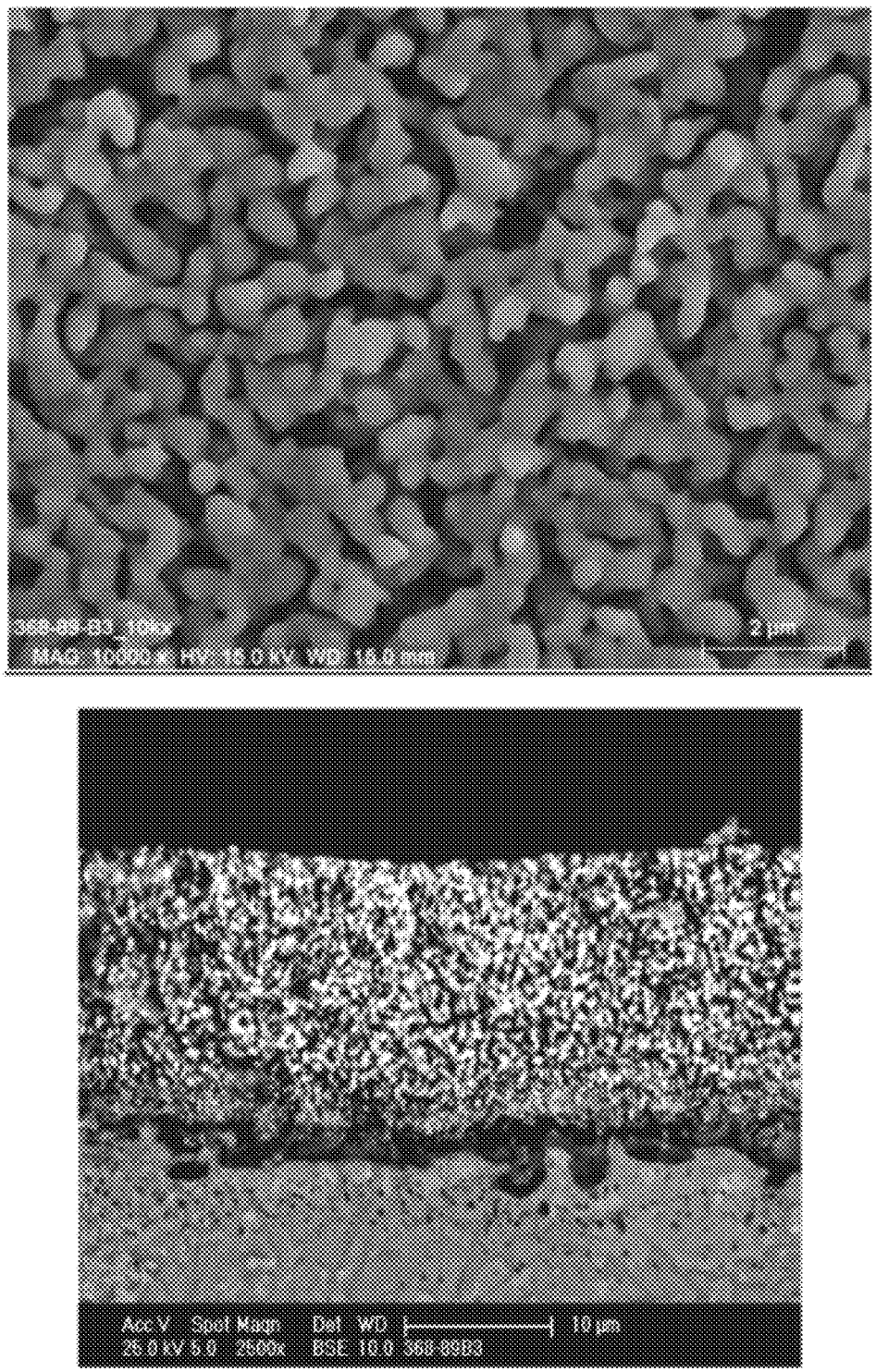
FIG. 14 depicts microstructure of the $La(Ni_{0.6}Co_{0.4})O_3$ coating of Example 6 fired in air at 1050° C. for 2 hours.
Figure 15:
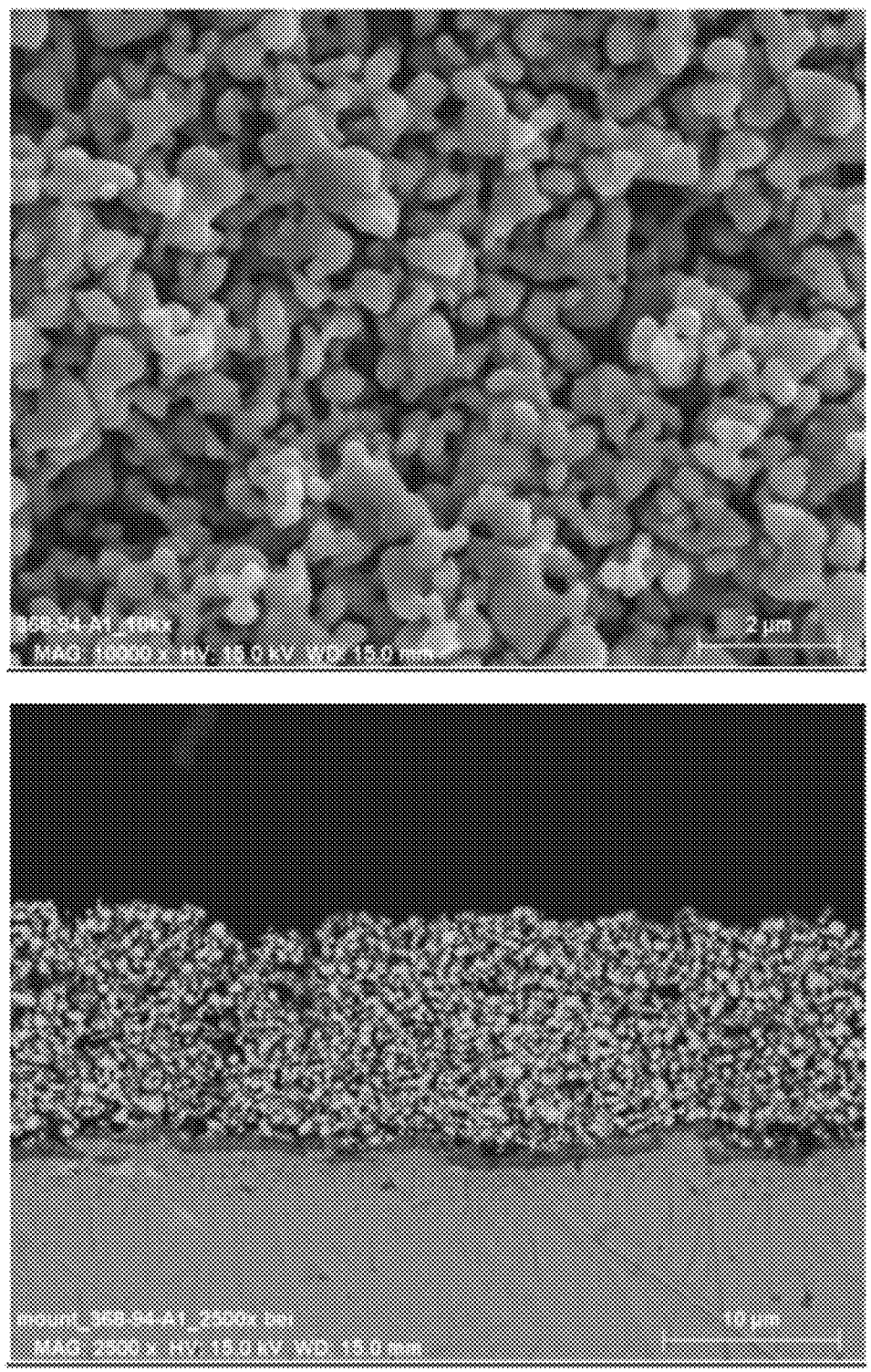
FIG. 15 depicts the microstructure of the $La_{0.95}(Ni_{0.6}Co_{0.4})O_3$ coating of Example 6 fired in air at 1000° C. for 2 hours.
Figure 16:
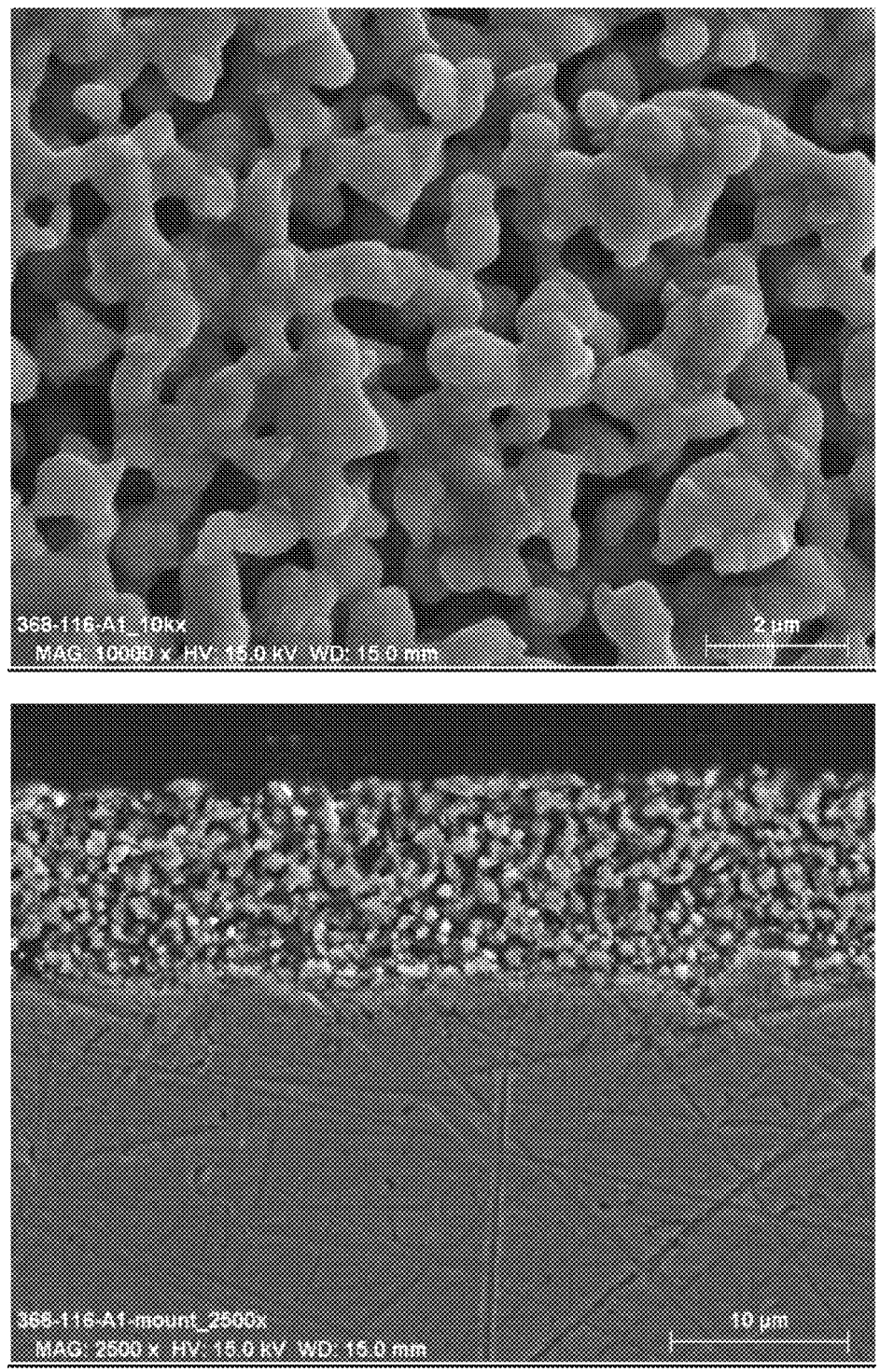
FIG. 16 depicts the microstructure of the $La_{0.95}(Ni_{0.6}Co_{0.4})O_3+5\%$ CuO coating of Example 6 fired in air at 1000° C. for 2 hours.

Solvent based spray suspensions were prepared with each of the three powders, a dispersant, and a binder. The layers were sprayed by hand using an aerosol spray airbrush. Films of ~10 micrometers were applied to both sides of 2×2 cm SS441 substrates (300 micrometers thick). The coated parts were annealed directly in air. FIG. 14 shows the microstructure of the La(Ni$_{0.6}$Co$_{0.4}$)O$_3$ formulation fired in air at 1050° C. for 2 hours. FIG. 15 shows the microstructure of the La$_{0.95}$(Ni$_{0.6}$Co$_{0.4}$)O$_3$ fired in air at 1000° C. for 2 hours, from top-down and cross-section perspective. Compared to the stoichiometric formulation, it exhibits a better adhered and denser coating. FIG. 16 shows the microstructure of the La$_{0.95}$(Ni$_{0.6}$Co$_{0.4}$)O$_3$+5% CuO which demonstrated microstructural coarsening, improved adhesion and enhanced density compared to the prior two samples of this example.

Other embodiments of perovskite coatings according to the present disclosure include the following:

1. LNF, where L is a lanthanide element or Y, N is Ni, and F is Fe.

LNF, which has been used previously as a porous contact paste but not as a non-porous coating, has a good CTE match (11.5-12.0 in the range of interest) with the stainless steels of interest, and it does not fail the way that LSM does as a cathode. Further, it has very low oxygen permeability.

2. LNM, where L is lanthanide element or Y, and N is Ni, and M is Mn

This material has reasonable conductivity ~50 S/cm. Because neither end member of the solid solution has oxygen vacancy as a principal defect compensation mechanism, it is believed to have extremely low ionic conductivity.

3. LNCu, where L is a lanthanide element or Y, and N is Ni, and Cu is Cu

4. LCoM, where L is a lanthanide element or Y, and Co is Co, and M is Mn

This material has moderate conductivity 80-120 S/cm at typical SOFC operating temperatures. Like the other materials described herein, it is believed that these compositions are very poor ionic conductors.

5. LCoCu, where L is a lanthanide element or Y, and Co is Co, and Cu is Cu

6. Variants of any of LNC or 1-5 above, incorporating Mg and/or other transition metals (such as Sc, Ti, V, Cr, Fe, Zn, Nb, Mo, or W) on the B-site of the crystal structure.

It will be readily apparent to those skilled in the art that examples described herein may have applicability beyond SOFCs components such as interconnects and current collectors. And various other ways in which the teachings herein may be used in other fields and/or other methods will be apparent to those of ordinary skill in the Art.

What is claimed is:

1. An electrochemical device comprising:
   (a) one or more solid oxide fuel cells (SOFCs), each of the SOFCs having a cathode, an anode, and an electrolyte layer positioned between the cathode and anode; and
   (b) at least one additional component which is not an electrode, said additional component comprising a metallic substrate having an electronically conductive, chromium-free perovskite coating deposited directly thereon;
   wherein the perovskite coating has the formula $A_xNi_yCo_{1-y}O_3$, wherein A is La, $0.9 \leq x \leq 1$, and $y < 1$, with the A site undoped by any alkaline earth element, and
   further wherein the perovskite coating exhibits an oxygen transference number of about 0.1 or less at a temperature of 600-1000° C., and is non-porous such that there is no continuous gas path through the thickness of the coating.

2. The electrochemical device of claim 1, wherein the perovskite coating exhibits n-type conductivity at a temperature of 600-1000° C.

3. The electrochemical device of claim 1, wherein the perovskite coating has a conductivity of at least about 50 S/cm at 700° C.

4. The electrochemical device of claim 3, wherein the perovskite coating has a conductivity of at least about 100 S/cm at 700° C.

5. The electrochemical device of claim 1, wherein the at least one additional component is an interconnect, a current collector, or a gas separator.

6. The electrochemical device of claim 1, wherein y is greater than 0.4.

7. The electrochemical device of claim 6, wherein x = 1.

8. The electrochemical device of claim 1, wherein y is greater than 0.5 and less than 0.7.

9. The electrochemical device of claim 8, wherein L is lanthanum, x is 1, and y is 0.6.

10. The electrochemical device of claim 1, wherein the perovskite coating has a thickness of between 1 and 40 micrometers.

11. The electrochemical device of claim 10, wherein the variation in the thickness of the perovskite is less than 20% of the nominal coating thickness.

12. The electrochemical device of claim 1 wherein the perovskite coating further comprises a transition metal oxide, the coating comprising greater than 0% by volume and up to 10% by volume of said transition metal oxide.

13. The electrochemical device of claim 12, wherein said transition metal oxide comprises CuO, the coating comprising greater than 0% by volume and up to 5% by volume CuO.

14. An electrochemical device comprising:
   (a) one or more solid oxide fuel cells (SOFCs), each of the SOFCs having a cathode, an anode, and an electrolyte layer positioned between the cathode and anode; and
   (b) at least one additional component chosen from the group consisting of an interconnect, a current collector and a gas separator, said additional component comprising a metallic substrate having an electronically conductive, chromium-free perovskite coating deposited directly thereon, said perovskite having the formula $A_xNi_yCo_{1-y}O_3$, wherein A is La, $0.9 \leq x \leq 1$, and $0.4 < y < 1$, with the A site undoped by any alkaline earth element;
   wherein the perovskite coating—
      exhibits an oxygen transference number of about 0.1 or less at a temperature of 600-1000° C.,
      is non-porous such that there is no continuous gas path through the thickness of the coating, and
      has a thickness of between 1 and 40 micrometers.

15. The electrochemical device of claim 14, wherein the perovskite coating comprises $La_xNi_{0.6}Co_{0.4}O_3$.

16. The electrochemical device of claim 15, wherein the perovskite coating comprises $LaNi_{0.6}Co_{0.4}O_3$.

17. The electrochemical device of claim 15, wherein the perovskite coating comprises $La_{0.95}Ni_{0.6}Co_{0.4}O_3$.

18. The electrochemical device of claim 14, wherein the metallic substrate comprises stainless steel.

* * * * *

UNITED STATES PATENT AND TRADEMARK OFFICE
CERTIFICATE OF CORRECTION

| | | |
|---|---|---|
| PATENT NO. | : 9,054,348 B2 | Page 1 of 1 |
| APPLICATION NO. | : 13/447155 | |
| DATED | : June 9, 2015 | |
| INVENTOR(S) | : Matthew M. Seabaugh, Sergio Ibanez and Scott L. Swartz | |

It is certified that error appears in the above-identified patent and that said Letters Patent is hereby corrected as shown below:

On Title Page, column 1

Item (73) Assignee: delete "NextTech Materials, Ltd." and replace with --NexTech Materials, Ltd.--.

Signed and Sealed this
Third Day of November, 2015

Michelle K. Lee
*Director of the United States Patent and Trademark Office*